United States Patent
Kumar et al.

(10) Patent No.: US 10,941,292 B2
(45) Date of Patent: Mar. 9, 2021

(54) FILLED COMPOSITES COMPRISING GLASS AND POLYESTER FIBERS

(71) Applicant: BORAL IP HOLDINGS (AUSTRALIA) PTY LIMITED, North Sydney (AU)

(72) Inventors: Amitabha Kumar, San Antonio, TX (US); Cassandra Hill, San Antonio, TX (US); Li Al, San Antonio, TX (US)

(73) Assignee: Boral IP Holdings (Australia) PTY Limited, North Sydney (AU)

( * ) Notice: Subject to any disclaimer, the term of this patent is extended or adjusted under 35 U.S.C. 154(b) by 59 days.

(21) Appl. No.: 16/336,389

(22) PCT Filed: Sep. 29, 2016

(86) PCT No.: PCT/US2016/054436
§ 371 (c)(1),
(2) Date: Mar. 25, 2019

(87) PCT Pub. No.: WO2018/063244
PCT Pub. Date: Apr. 5, 2018

(65) Prior Publication Data
US 2019/0225800 A1    Jul. 25, 2019

(51) Int. Cl.
*C08L 75/04*    (2006.01)
*C08K 3/013*    (2018.01)
(Continued)

(52) U.S. Cl.
CPC .......... *C08L 75/04* (2013.01); *C08G 18/4018* (2013.01); *C08G 18/4211* (2013.01);
(Continued)

(58) Field of Classification Search
CPC ..... C08L 75/04; C08L 2205/16; C08K 3/013; C08K 7/02; C08K 7/14; C08G 18/4018;
(Continued)

(56) References Cited

U.S. PATENT DOCUMENTS

| 3,236,895 A | 2/1966 | Lee et al. |
| 4,062,999 A | 12/1977 | Kondo et al. |

(Continued)

FOREIGN PATENT DOCUMENTS

| WO | WO 2004/080698 A1 | 9/2004 |
| WO | WO 2005/072485 A2 | 8/2005 |

(Continued)

OTHER PUBLICATIONS

International Search Report in PCT/US2016/054436 dated Jun. 30, 2017 (4 pages).

(Continued)

*Primary Examiner* — William K Cheung
(74) *Attorney, Agent, or Firm* — Bookoff McAndrews, PLLC

(57) ABSTRACT

Polyurethane composites having improved mechanical strength and linear coefficient of thermal expansion (LCTE) and methods of manufacturing are described herein. The composites can include (a) a polyurethane formed by the reaction of (i) one or more isocyanates selected from the group consisting of diisocyanates, polyisocyanates, and mixtures thereof, and (ii) one or more polyols; (b) a filler in an amount of from greater than 50% to 90% by weight, based on the total weight of the polyurethane composite, (c) from 0.25% to 10% by weight, based on the total weight of the composite, of glass fibers; and (d) from 0.025% to 5% by weight, based on the total weight of the composite, of polyester fibers. The polyester fibers can have an average aspect ratio of length to diameter of from 5:1 to 600:1. The LCTE (−40° C. to 70° C.) of the polyurethane composite can be 2.2×10-5/° C. or less.

20 Claims, 1 Drawing Sheet

(51) Int. Cl.
*C08K 7/02* (2006.01)
*C08K 7/14* (2006.01)
*C08K 3/04* (2006.01)
*C08G 18/48* (2006.01)
*C08G 18/42* (2006.01)
*C08G 18/76* (2006.01)
*C08G 18/40* (2006.01)
*C08G 18/50* (2006.01)
*C08J 5/04* (2006.01)

(52) U.S. Cl.
CPC ..... *C08G 18/4841* (2013.01); *C08G 18/5021* (2013.01); *C08G 18/7671* (2013.01); *C08J 5/047* (2013.01); *C08K 3/013* (2018.01); *C08K 7/02* (2013.01); *C08J 2375/04* (2013.01); *C08J 2467/00* (2013.01); *C08K 3/04* (2013.01); *C08K 7/14* (2013.01); *C08L 2205/16* (2013.01)

(58) Field of Classification Search
CPC ............ C08G 18/4211; C08G 18/4841; C08G 18/5021; C08G 18/7671; C08J 5/047; C08J 2375/04; C08J 2467/00
USPC ........................................................ 524/444
See application file for complete search history.

(56) References Cited

U.S. PATENT DOCUMENTS

| | | |
|---|---|---|
| 4,683,246 A | 7/1987 | Davis et al. |
| 4,687,796 A | 8/1987 | Cordova et al. |
| 4,883,826 A | 11/1989 | Marugg et al. |
| 5,064,876 A | 11/1991 | Hamada et al. |
| 5,082,738 A | 1/1992 | Swofford |
| 5,508,315 A | 4/1996 | Mushovic |
| 6,258,310 B1 | 7/2001 | Sardanopoli et al. |
| 6,602,379 B2 | 8/2003 | Li et al. |
| 7,241,818 B2 | 7/2007 | Hemmings et al. |
| 7,879,144 B2 | 2/2011 | Hemmings et al. |
| 8,846,776 B2 | 9/2014 | Herrington et al. |
| 2005/0266222 A1 | 12/2005 | Clark et al. |
| 2008/0132611 A1 | 6/2008 | Brown |
| 2011/0086934 A1 | 4/2011 | Herrington et al. |
| 2012/0148803 A1 | 6/2012 | Schleiermacher et al. |
| 2018/0237617 A1* | 8/2018 | Hocke .................. C08L 75/04 |

FOREIGN PATENT DOCUMENTS

| | | |
|---|---|---|
| WO | WO 2013/000860 A1 | 1/2013 |
| WO | WO 2017/105459 A1 | 6/2017 |
| WO | WO 2017/180154 A1 | 10/2017 |

OTHER PUBLICATIONS

Araujo, E. M. et al., "Fiberglass wastes/polyester resin composites: Mechanical properties and water sorption," *Polimeros*, vol. 16, pp. 332-335 (2006).

Fibermax Composites, "Types of Fiber Reinforcement," 2002-2018 (2 pages), available at http://www.fibermaxcomposites.com/shop/index_files/typesoffiber.html.

* cited by examiner

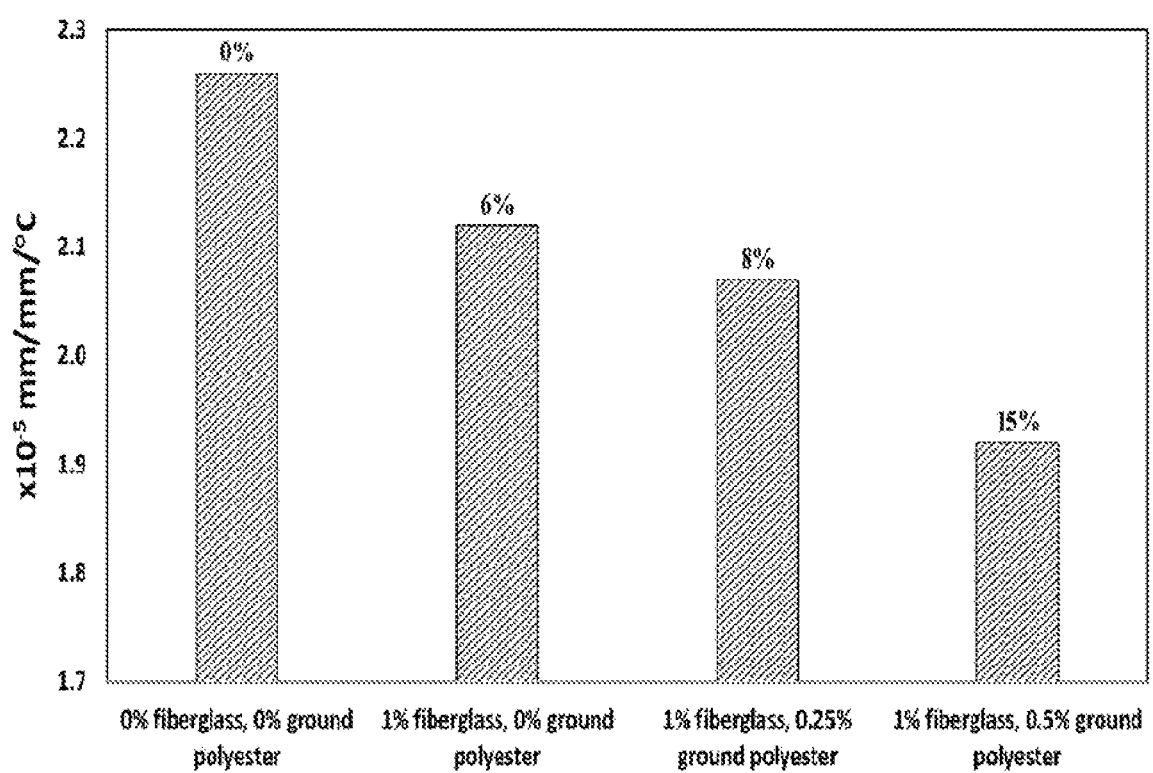

FILLED COMPOSITES COMPRISING GLASS AND POLYESTER FIBERS

The present application is a 35 U.S.C. 371 national stage application of PCT International Application No. PCT/US2016/054436, filed on Sep. 29, 2016, the disclosures of which are hereby incorporated in their entireties by reference.

FIELD OF THE DISCLOSURE

This disclosure relates generally to polyurethane composites, more particularly, to the use of polyester fibers in polyurethane composites.

BACKGROUND OF THE DISCLOSURE

Polymeric composites that contain organic and/or inorganic filler materials have become desirable for a variety of uses because of their excellent mechanical properties and weathering stability. In general, the superior properties of the organic-inorganic composites are achieved through use of the organic as a matrix material that acts as a glue with enhanced flexural properties or as a fibrous component providing reinforcement and improved tensile properties. The inorganic material imparts various properties of rigidity, toughness, hardness, optical appearance, interaction with electromagnetic radiation, density, and many other physical and chemical attributes.

The use of polyurethane composites has grown due to their superior tensile strength, impact resistance, and abrasion resistance compared to, for example, unsaturated polyester and vinyl ester-based composites. Processes for preparing polyurethane composites are known and have significant commercial success. However, despite the success achieved using this material, materials with improved thermal stability or that resist contraction and expansion during changes in temperatures are still required. Such materials must be chosen so that the properties of the resulting product and the processability of the material are suitable for manufacture and the intended use, as well as are commercially viable. The compositions and methods described herein address these and other needs.

SUMMARY OF THE DISCLOSURE

Polyurethane composites comprising polyester fibers and glass fibers and methods of manufacturing are described herein. The composites exhibit increased mechanical strength and a reduced linear coefficient of thermal expansion (LCTE) compared to similar composites that do not include polyester and glass fibers. In some embodiments, the polyurethane composites can include (a) a polyurethane formed by the reaction of (i) one or more isocyanates selected from the group consisting of diisocyanates, polyisocyanates, and mixtures thereof, and (ii) one or more polyols; (b) a filler in an amount of from greater than 50% to 90% by weight, based on the total weight of the polyurethane composite, (c) from 0.25% to 10% by weight, based on the total weight of the composite, of glass fibers; and (d) from 0.025% to 5% by weight, based on the total weight of the composite, of polyester fibers, wherein the polyester fibers have an average aspect ratio of length to diameter of from 5:1 to 600:1. The polymer composites described herein have a low LCTE. In particular, the LCTE (−40° C. to 70° C.) of the composites can be $2.2 \times 10^{-5}$/° C. or less (e.g., from $1.6 \times 10^{-5}$/° C. to $2.2 \times 10^{-5}$/° C.). The density of the composites can be from 10 lb/ft$^3$ to 75 lb/ft$^3$ such as from 10 lb/ft$^3$ to 30 lb/ft$^3$ or from 35 lb/ft$^3$ to 70 lb/ft$^3$.

The amount of polyurethane in the polyurethane composite can be from 15% to 60% by weight, for example, from 15% to 45% by weight, based on the total weight of the polyurethane composite. As described herein, the polyurethane composites can include a filler. The filler can include a particulate filler. The particulate filler in the polyurethane composite can include coal ash such as fly ash. The amount of particulate filler in the polyurethane composites can be from 50 to 90% by weight, based on the total weight of the polyurethane composite. For example, the particulate filler can be present in an amount from 50% to 85% or from 60% to 80% by weight, based on the total weight of the polyurethane composite. The filler in the polyurethane composite can have a median particle size of less than 25 microns. In some embodiments, the filler has a particle size distribution having at least two modes.

The glass fibers present in the polyurethane composites can be from 0.25% to 10% by weight, based on the total weight of the polyurethane composite. In some examples, the glass fibers can be present in an amount from 0.25% to 8%, from 0.25% to 6%, from 0.5% to 6%, or from 0.5% to 5% by weight, based on the total weight of the polyurethane composite. The glass fibers can have an average length of 1 mm or greater. In some examples, the glass fibers can have an average length of from 1.5 mm to 30 mm. The glass fibers can have an average diameter of from 5 to 55 microns.

The polyurethane composites described herein include polyester fibers. The amount of polyester fibers in the polyurethane composites can be from 0.025% to 5% by weight, based on the total weight of the composite. For example, the polyester fibers can be present in an amount from 0.05% to 5% or from 0.1% to 5% by weight, based on the total weight of the polyurethane composite. The polyester fibers can have an average length of 15 mm or less. In some examples, the polyester fibers can have an average length of from 10 microns to 15 mm, from 10 microns to 10 mm, from 10 microns to 5 mm, or from 10 microns to 2 mm. The polyester fibers can have an average diameter of 100 microns or less. For example, the polyester fibers can have an average diameter of from 3 microns to 100 microns. The average aspect ratio of length to diameter of the polyester fibers can be from 5:1 to 600:1, such as from 5:1 to 100:1, from 5:1 to 50:1, or from 10:1 to 50:1. The polyester fibers can have an average linear mass density of 9 denier or less. In some examples, the polyester fibers include ground polyester fibers.

In some embodiments, the fibers can be coated with a composition to modify the reactivity of the fibers. For example, the fibers can be coated with surfactants, bonding agents, pigments, coupling agents, or combinations thereof.

The density of the polyurethane composites can be from 10 lb/ft$^3$ to 75 lb/ft$^3$. In some embodiments, the density of the polyurethane composites can be from 10 lb/ft$^3$ to 30 lb/ft$^3$, from 35 lb/ft$^3$ to 75 lb/ft$^3$, or from 35 lb/ft$^3$ to 50 lb/ft$^3$. In some examples, the polyurethane composites are foamed. The polyurethane composites can have a flexural strength of 200 psi or greater, as measured by ASTM C1185.

Articles comprising the polyurethane composites are also disclosed. In some embodiments, the articles can be building products. In certain embodiments, the building products can include (a) a polyurethane formed by the reaction of (i) one or more isocyanates selected from the group consisting of diisocyanates, polyisocyanates, and mixtures thereof, and (ii) one or more polyols; (b) from greater than 50% to 90% by weight, based on the total weight of the building product, of fly ash; (c) 0.25% to 10% by weight, based on the total weight of the building product, of glass fibers, wherein the glass fibers have an average length of from 1.5 to 33 mm and an average diameter of from 5 to 55 microns; and (d) 0.025% to 5% by weight, based on the total weight of the building product, of polyester fibers, wherein the polyester fibers have an average aspect ratio of length to diameter of from 5:1 to 50:1; wherein the building product has a linear coefficient of thermal expansion (−40° C. to 70° C.) of $2.2 \times 10^{-5}$/° C. or less and a density of from 10 lb/ft$^3$ to 75 lb/ft$^3$. The building products formed from the composites can be selected from siding materials, building panels, sheets, architectural moldings, sound barriers, thermal barriers, insulation, wall boards, ceiling tiles, ceiling boards, soffits, and roofing materials.

Methods of making the polyurethane composites are also described herein. The method can include mixing the (i) one or more isocyanates selected from the group consisting of diisocyanates, polyisocyanates, and mixtures thereof, (ii) one or more polyols, (iii) filler, (iv) glass fibers, and (v) polyester fibers to form a mixture. The mixture may further comprise a catalyst. The mixture can include the catalyst at 0.05 to 0.5 part per hundred parts of polyol. The polyurethane mixture can be formed in a mold. In some embodiments, the method can include applying the mixture to a mold at a viscosity of from 400,000 cPs or less at the temperature of the mixture. The method of making the polyurethane composite can include allowing the mixture to react and expand to form the polyurethane composite. In some embodiments, the mixture can be allowed to rise freely during foaming in the mold.

DESCRIPTION OF THE DRAWINGS

The FIGURE is a bar graph showing the linear coefficient of thermal expansion (LCTE) with various polyester fiber and fiberglass contents in a filled polyurethane composite. All the mixtures used to form the polyurethane composition contains 23% polyurethane by weight, the stated amounts by weight of fiberglass and/or ground polyester fibers, and the balance fly ash. The numbers above each bar show the percent decrease in LCTE compared to the control without any polyester or glass fibers.

DETAILED DESCRIPTION

Polyurethane composites including polyester fibers and glass fibers and methods of preparing the composites are described herein. The polyester fibers and glass fibers provide the composites with improved properties including, increased mechanical strength, reduced linear coefficient of thermal expansion (LCTE), and lowered cost, compared to composites without the polyester fibers and glass fibers. The term "linear coefficient of thermal expansion" is used interchangeably with "coefficient of thermal expansion" (CTE) and refers to the change in length per unit rise in temperature. A low coefficient of thermal expansion is desirable in many applications, such as in composites used to prepare exterior building products. In particular, building products may thermally expand and/or contract, and may cause dimensional changes in the product as the external temperature fluctuates. Alternately, temperature fluctuations can become a source of damaging stress for the building materials as the thermal dimensional changes may be restricted as part of installation. Lowering the CTE of the building products may reduce the effects and stress that are created by temperature fluctuations and may ultimately increase the life of the product.

In addition to the polyester fibers and glass fibers, the polyurethane composites can comprise a polyurethane formed using reactive systems such as reactive isocyanates and reactive polyols. In some embodiments, the composites can be formed using highly reactive systems including highly reactive polyols, highly reactive isocyanates, or both. Isocyanates suitable for use in the polyurethane composites can include one or more monomeric or oligomeric poly- or di-isocyanates. The monomeric or oligomeric poly- or di-isocyanate may include aromatic diisocyanates and polyisocyanates. The isocyanates can also be blocked isocyanates or pre-polymer isocyanates. The particular isocyanate used in the composites can be selected based on the desired properties of the composites, such as the amount of foaming, strength of bonding to the filler, wetting of the inorganic particulates in the reaction mixture, strength of the resulting composite, stiffness (elastic modulus), reactivity, and viscosity of the mixture.

An example of a useful diisocyanate is methylene diphenyl diisocyanate (MDI). Suitable MDI's include MDI monomers, MDI oligomers, and mixtures thereof. Further examples of useful isocyanates include those having NCO (i.e., the reactive group of an isocyanate) contents ranging from about 25% to about 35% by weight. Examples of useful isocyanates are found, for example, in *Polyurethane Handbook: Chemistry, Raw Materials, Processing Application, Properties*, 2$^{nd}$ Edition, Ed: Gunter Oertel; Hanser/Gardner Publications, Inc., Cincinnati, Ohio, which is herein incorporated by reference. Suitable examples of aromatic polyisocyanates include 2,4- or 2,6-toluene diisocyanate, including mixtures thereof; p-phenylene diisocyanate; tetramethylene and hexamethylene diisocyanates; 4,4-dicyclohexylmethane diisocyanate; isophorone diisocyanate; 4,4-phenylmethane diisocyanate; polymethylene polyphenylisocyanate; and mixtures thereof. In addition, triisocyanates may be used, for example, 4,4,4-triphenylmethane triisocyanate; 1,2,4-benzene triisocyanate; polymethylene polyphenyl polyisocyanate; methylene polyphenyl polyisocyanate; and mixtures thereof. Suitable blocked isocyanates are formed by the treatment of the isocyanates described herein with a blocking agent (e.g., diethyl malonate, 3,5-dimethylpyrazole, methylethylketoxime, and caprolactam). Isocyanates are commercially available, for example, from Bayer Corporation (Pittsburgh, Pa.) under the trademarks MONDUR and DESMODUR. Other examples of suitable isocyanates include MONDUR MR Light (Bayer Corporation; Pittsburgh, Pa.), PAPI 27 (Dow Chemical Company; Midland, Mich.), Lupranate M20 (BASF Corporation; Florham Park, N.J.), Lupranate M70L (BASF Corporation; Florham Park, N.J.), Rubinate M (Huntsman Polyurethanes; Geismar, La.), Econate 31 (Ecopur Industries), and derivatives thereof. In some embodiments, the isocyanate compositions used to form the composite can include those having viscosities ranging from 25 to 700 cPs at 25° C.

The average functionality of isocyanates useful with the polyurethane composites described herein can be from 1.5 to 5. Further, examples of useful isocyanates include isocyanates with an average functionality of from 2 to 4.5, from 2.2 to 4, from 2.4 to 3.7, from 2.6 to 3.4, or from 2.8 to 3.2.

As indicated herein, the polyurethane composites can include one or more polyols. The one or more polyols for use in the polyurethane composites can include polyester polyols, polyether polyols, Mannich polyols, or combinations thereof. In some embodiments, the one or more polyols can include a first polyol and/or a second polyol as described herein.

The one or more polyols can include one or more less reactive (or first) polyols. The less reactive polyol can have lower numbers of primary hydroxyl groups, lower primary hydroxyl numbers, and higher numbers of secondary hydroxyl groups, than a highly reactive polyol. As used herein, the primary hydroxyl number is defined as the hydroxyl number multiplied by the percentage of primary hydroxyl groups based on the total number of hydroxyl groups in the polyol. The one or more less reactive polyols can have about 40% or less primary hydroxyl groups, about 35% or less primary hydroxyl groups, about 30% or less primary hydroxyl groups, about 25% or less primary hydroxyl groups, about 20% or less primary hydroxyl groups, about 15% or less primary hydroxyl groups, or even about 10% or less primary hydroxyl groups. The one or more less reactive polyols can have primary hydroxyl numbers (as measured in units of mg KOH/g) of less than about 220, less than about 200, less than about 180, less than about 160, less than about 140, less than about 120, less than about 100, less than about 80, less than about 60, less than about 40, or even less than about 20. The number of primary hydroxyl groups can be determined using fluorine NMR spectroscopy as described in ASTM D4273.

The one or more less reactive polyols can have hydroxyl numbers (as measured in units of mg KOH/g) of 700 or less, 650 or less, 600 or less, 550 or less, 500 or less, 450 or less, 400 or less, 350 or less, 300 or less, 250 or less, 200 or less, 150 or less, 125 or less, 100 or less, 80 or less, 60 or less, 40 or less, or even 20 or less. The one or more less reactive polyols can have hydroxyl numbers (as measured in units of mg KOH/g) of 50 or more, 100 or more, 150 or more, 200 or more, 250 or more, 300 or more, 350 or more, 400 or more, 450 or more, or 500 or more. In some embodiments, the average hydroxyl number can be 700 or less, 650 or less, 600 or less, 550 or less, 500 or less, 450 or less, 400 or less, 350 or less, 300 or less, or 250 or less, and/or is 100 or more, 150 or more, 200 or more, 250 or more, 300 or more, 350 or more, 400 or more, 450 or more, or 500 or more. For example, the average hydroxyl number can be from 100 to 700, from 100 to 500, from 150 to 450, or from 200 to 400. In some embodiments, the one or more less reactive polyols can include two or more polyols. For example, there can be a blend of 75% of a polyol having a hydroxyl number of 400 and 25% of a polyol having a hydroxyl number of 100 to produce an average hydroxyl number of 325.

The functionality of the one or more less reactive polyols useful with the polyurethane composites described herein can be 4 or less, 3.5 or less, 3.25 or less, 3 or less, 2.75 or less, 2.5 or less, or 2.25 or less. In some embodiments, the functionality of the one or more less reactive polyols can be 2 or greater, 2.25 or greater, 2.5 or greater, 2.75 or greater, 3 or greater, 3.25 or greater, 3.5 or greater, or 3.75 or greater. The average functionality of the one or more less reactive polyols useful with the composites described herein can be 4 or less, 3.5 or less, 3.25 or less, 3 or less, 2.75 or less, 2.5 or less, or 2.25 or less. In some embodiments, the average functionality of the one or more less reactive polyols can be 2 or greater, 2.25 or greater, 2.5 or greater, 2.75 or greater, 3 or greater, 3.25 or greater, 3.5 or greater, or 3.75 or greater. Further, examples of useful less reactive polyols include polyols with an average functionality of from 2 to 4, from 2.5 to 4, or from 2 to 3.5.

The one or more less reactive polyols can have an average molecular weight of 250 g/mol or greater (e.g., 300 g/mol or greater, 350 g/mol or greater, 400 g/mol or greater, 450 g/mol or greater, 500 g/mol or greater, 550 g/mol or greater, 600 g/mol or greater, 650 g/mol or greater, or 700 g/mol or greater). In some cases, the one or more less reactive polyols have an average molecular weight of 700 g/mol or less (e.g., 650 g/mol or less, 600 g/mol or less, 550 g/mol or less, 500 g/mol or less, 450 g/mol or less, 400 g/mol or less, 350 g/mol or less, or 300 g/mol or less). In some cases, the one or more less reactive polyols have an average molecular weight of from 250 g/mol to 750 g/mol, from 250 g/mol to 600 g/mol, or from 250 g/mol to 500 g/mol.

The one or more less reactive polyols can include an aromatic polyester polyol, an aromatic polyether polyol, or a combination thereof. The aromatic polyol can have an aromaticity of 50% or less, such as 45% or less, or 40% or less. In some embodiments, the aromatic polyol can have an aromaticity of 35% or greater, such as 38% or greater, 40% or greater, or 45% or greater. In some examples, the one or more less reactive polyols include an aromatic polyester polyol such as those sold under the TEROL® trademark (e.g., TEROL® 198 and TEROL® 250). Other examples of less reactive polyols include a glycerin-based polyol and derivatives thereof commercially available from Carpenter Co. (e.g., Carpol® GP-240; Carpol® GP-725; Carpol® GP-700; Carpol® GP-1000; Carpol® GP-1500); polypropylene-based polyol and derivatives thereof commercially available from Huntsman International (e.g., Jeffol® FX31-240; Jeffol® G30-650; Jeffol® FX31-167; Jeffol® A-630; Jeffol® AD-310); polyester polyols available from Huntsman International (e.g., XO 13001); castor oil; Stepanpol PS-2052A (commercially available from the Stepan Company); Agrol 2.0, 3.6, 4.3, 5.6 and 7.0 (plant-based polyols commercially available from BioBased Technologies); Ecopol 123 and Ecopol 124, which are commercially available from Ecopur Industries; Honey Bee HB-150 and HB-230, soybean oil-based polyols commercially available from MCPU Polymer Engineering; Terol 1154, commercially available from Oxid (Houston, Tex.); Multranol 3900, Multranol 3901, Arcol 11-34, Arcol 24-32, Arcol 31-28, Arcol E-351, Arcol LHT-42, and Arcol LHT-112, commercially available from Bayer; and Voranol 220-028, 220-094, 220-110N, 222-056, 232-027, 232-034, and 232-035, commercially available from Dow Chemical Company.

The one or more less reactive polyols can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the at one or more polyols. In some embodiments, the one or more less reactive polyols can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the at one or more polyols.

The one or more polyols can include one or more highly reactive (or second) polyols. The one or more highly reactive polyols can include polyols having a large number of primary hydroxyl groups (e.g. 75% or more) based on the total number of hydroxyl groups in the polyol. For example, the high primary hydroxyl group polyols can include 80% or more, 85% or more, 90% or more, 95% or more, or 100% of primary hydroxyl groups. In some embodiments, the one or more highly reactive polyols can include polyols having a primary hydroxyl number of greater than 250. For example, the primary hydroxyl number can be greater than 300, greater than 320, greater than 340, greater than 360, greater than 380, greater than 400, greater than 420, greater than 460, greater than 465, or greater than 470.

The one or more highly reactive polyols can include polyols having a hydroxyl number of greater than 250. For example, the hydroxyl number can be greater than 275, greater than 300, greater than 325, greater than 350, greater than 375, greater than 400, greater than 425, greater than 450, greater than 475, greater than 500, greater than 525, greater than 550, greater than 575, greater than 600, greater than 625, greater than 650, greater than 675, greater than 700, greater than 725, or greater than 750.

The average functionality of the one or more highly reactive polyols useful with the polyurethane composites described herein can be 3.5 or greater, (e.g., 3.5 or greater, 3.6 or greater, 3.7 or greater, 3.8 or greater, 3.9 or greater, 4.0 or greater, 4.1 or greater, 4.2 or greater, 4.5 or greater, 5 or greater, or 6 or greater). In some embodiments, the average functionality of the one or more highly reactive polyols useful with the polyurethane composites can be 8 or less, (e.g., 7 or less, 6 or less, 5.5 or less, 5 or less, or 4.5 or less). Further, examples of useful one or more highly reactive polyols include polyols with an average functionality of from 3.5 to 8, from 3.5 to 7, from 3.5 to 6, from 3.5 to 5, or from 4 to 5.

In some cases, the one or more highly reactive polyols has a molecular weight of 350 g/mol or greater (e.g., 400 g/mol or greater, 450 g/mol or greater, 460 g/mol or greater, 470 g/mol or greater, 480 g/mol or greater, or 500 g/mol or greater). In some cases, the one or more highly reactive polyols has a molecular weight of 1000 g/mol or less (e.g., 900 g/mol or less, 800 g/mol or less, 700 g/mol or less, 600 g/mol or less, 550 g/mol or less, 540 g/mol or less, 530 g/mol or less, 520 g/mol or less, 500 g/mol or less, 480 g/mol or less, or 450 g/mol or less). In some cases, the one or more highly reactive polyols has a molecular weight of from 350 g/mol to 1000 g/mol or less, from 350 g/mol to 900 g/mol or less, from 400 g/mol to 800 g/mol or less, or from 400 g/mol to 700 g/mol or less.

In some embodiments, the one or more highly reactive polyols can include a Mannich polyol. Mannich polyols are the condensation product of a substituted or unsubstituted phenol, an alkanolamine, and formaldehyde. Mannich polyols can be prepared using methods known in the art. For example, Mannich polyols can be prepared by premixing the phenolic compound with a desired amount of the alkanolamine, and then slowly adding formaldehyde to the mixture at a temperature below the temperature of Novolak formation. At the end of the reaction, water is stripped from the reaction mixture to provide a Mannich base. See, for example, U.S. Pat. No. 4,883,826, which is incorporated herein by reference in its entirety. The Mannich base can then be alkoxylated to provide a Mannich polyol.

The substituted or unsubstituted phenol can include one or more phenolic hydroxyl groups. In certain embodiments, the substituted or unsubstituted phenol includes a single hydroxyl group bound to a carbon in an aromatic ring. The phenol can be substituted with substituents which do not undesirably react under the conditions of the Mannich condensation reaction, a subsequent alkoxylation reaction (if performed), or the preparation of polyurethanes from the final product. Examples of suitable substituents include alkyl (e.g., a $C_1$-$C_{18}$ alkyl, or a $C_1$-$C_{12}$ alkyl), aryl, alkoxy, phenoxy, halogen, and nitro groups.

Examples of suitable substituted or unsubstituted phenols that can be used to form Mannich polyols include phenol, o-, p-, or m-cresols, ethylphenol, nonylphenol, dodecylphenol, p-phenylphenol, various bisphenols including 2,2-bis(4-hydroxyphenyl)propane (bisphenol A), β-naphthol, β-hydroxyanthracene, p-chlorophenol, o-bromophenol, 2,6-dichlorophenol, p-nitrophenol, 4- or 2-nitro-6-phenylphenol, 2-nitro-6- or 4-methylphenol, 3,5-dimethylphenol, p-isopropylphenol, 2-bromo-6-cyclohexylphenol, and combinations thereof. In some embodiments, the Mannich polyol is derived from phenol or a monoalkyl phenols (e.g., a para-alkyl phenols). In some embodiments, the Mannich polyol is derived from a substituted or unsubstituted phenol selected from the group consisting of phenol, para-n-nonylphenol, and combinations thereof.

The alkanolamine used to produce the Mannich polyol can include a monoalkanolamine, a dialkanolamine, a trialkanolamine, a tetraalkanolamine, or combinations thereof. Examples of suitable monoalkanolamines include methylethanolamine, ethylethanolamine, methylisopropanolamine, ethylisopropanolamine, methyl-2-hydroxybutylamine, phenylethanolamine, ethanolamine, isopropanolamine, and combinations thereof. Suitable dialkanolamines include dialkanolamines which include two hydroxy-substituted $C_1$-$C_{12}$ alkyl groups (e.g., two hydroxy-substituted $C_1$-$C_8$ alkyl groups, or two hydroxy-substituted $C_1$-$C_6$ alkyl groups). The two hydroxy-substituted alkyl groups can be branched or linear, and can be of identical or different chemical composition. Examples of suitable dialkanolamines include diethanolamine, diisopropanolamine, ethanolisopropanolamine, ethanol-2-hydroxybutylamine, isopropanol-2-hydroxybutylamine, isopropanol-2-hydroxyhexylamine, ethanol-2-hydroxyhexylamine, and combinations thereof. Suitable trialkanolamines include trialkanolamines which include three hydroxy-substituted $C_1$-$C_{12}$ alkyl groups (e.g., three hydroxy-substituted $C_1$-$C_8$ alkyl groups, or three hydroxy-substituted $C_1$-$C_6$ alkyl groups). The three hydroxy-substituted alkyl groups can be branched or linear, and can be of identical or different chemical composition. Examples of suitable trialkanolamines include triisopropanolamine (TIPA), triethanolamine, N,N-bis(2-hydroxyethyl)-N-(2-hydroxypropyl)amine (DEIPA), N,N-bis(2-hydroxypropyl)-N-(hydroxyethyl)amine (EDIPA), tris(2-hydroxybutyl)amine, hydroxyethyl di(hydroxypropyl)amine, hydroxypropyl di(hydroxyethyl)amine, tri(hydroxypropyl)amine, hydroxyethyl di(hydroxy-n-butyl)amine, hydroxybutyl di(hydroxypropyl)amine, and combinations thereof. Exemplary tetraalkanolamines include four hydroxy-substituted $C_1$-$C_{12}$ alkyl groups (e.g., four hydroxy-substituted $C_1$-$C_8$ alkyl groups, or four hydroxy-substituted $C_1$-$C_6$ alkyl groups). In certain embodiments, the alkanolamine is selected from the group consisting of diethanolamine, diisopropanolamine, and combinations thereof.

Any suitable alkylene oxide or combination of alkylene oxides can be used to form the Mannich polyol. In some embodiments, the alkylene oxide is selected from the group consisting of ethylene oxide, propylene oxide, butylene oxide, and combinations thereof. In certain embodiments, the Mannich polyol is alkoxylated with from 100% to about 80% propylene oxide and from 0 to about 20 wt % ethylene oxide.

Mannich polyols are known in the art, and include, for example, ethylene and propylene oxide-capped Mannich polyols sold under the trade names CARPOL® MX-425 and CARPOL® MX-470 (Carpenter Co., Richmond, Va.).

The one or more highly reactive polyols can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the at one or more polyols. In some embodiments, the one or more highly reactive polyols can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the at one or more polyols.

In some embodiments, the one or more polyols can include a sucrose and/or amine-based polyol. The sucrose and/or amine-based polyol can include, for example, a polyether polyol (including for example ethylene oxide, propylene oxide, butylene oxide, and combinations thereof) which is initiated by a sucrose and/or amine group. Sucrose and/or amine-based polyols are known in the art, and include, for example, sucrose/amine initiated polyether polyol sold under the trade name CARPOL® SPA-357 or CARPOL® SPA-530 (Carpenter Co., Richmond, Va.) and triethanol amine initiated polyether polyol sold under the trade name CARPOL® TEAP-265 (Carpenter Co., Richmond, Va.). The sucrose and/or amine-based polyol can be present in an amount of greater than 10%, greater than 20%, greater than 30%, greater than 40%, greater than 45%, greater than 50%, greater than 55%, greater than 60%, greater than 65%, greater than 70%, greater than 75%, greater than 80%, greater than 85%, greater than 90%, greater than 95%, or 100% by weight, based on the weight of the at one or more polyols. In some embodiments, the sucrose and/or amine-based polyol can be present in an amount of 95% or less, 90% or less, 85% or less, 80% or less, 75% or less, 70% or less, 65% or less, 60% or less, 55% or less, 50% or less, 45% or less, 35% or less, 25% or less, or 20% or less, based on the weight of the at one or more polyols.

Other suitable isocyanate-reactive monomers that can be used in the polyurethane composites include one or more polyamines. Suitable polyamines can correspond to the polyols described herein (for example, a polyester polyol or a polyether polyol), with the exception that the terminal hydroxy groups are converted to amino groups, for example by amination or by reacting the hydroxy groups with a diisocyanate and subsequently hydrolyzing the terminal isocyanate group to an amino group. By way of example, the polyamine can be polyether polyamine, such as polyoxyalkylene diamine or polyoxyalkylene triamine. Polyether polyamines are known in the art, and can be prepared by methods including those described in U.S. Pat. No. 3,236,895 to Lee and Winfrey.

Exemplary polyoxyalkylene diamines are commercially available, for example, from Huntsman Corporation under the trade names Jeffamine® D-230, Jeffamine® D-400 and Jeffamine® D-2000. Exemplary polyoxyalkylene triamines are commercially available, for example, from Huntsman Corporation under the trade names Jeffamine® T-403, Jeffamine® T-3000, and Jeffamine® T-5000.

In some embodiments, the one or more polyols can include an alkoxylated polyamine (i.e., alkylene oxide-capped polyamines) derived from a polyamine and an alkylene oxide. Alkoxylated polyamines can be formed by reacting a suitable polyamine with a desired number of moles of an alkylene oxide. Suitable polyamines include monomeric, oligomeric, and polymeric polyamines. In some cases, the polyamines has a molecular weight of less than 1000 g/mol (e.g., less than 800 g/mol, less than 750 g/mol, less than 500 g/mol, less than 250 g/mol, or less than 200 less than 200 g/mol). Examples of suitable polyamines that can be used to form alkoxylated polyamines include ethylenediamine, 1,3-diaminopropane, putrescine, cadaverine, hexamethylenediamine, 1,2-diaminopropane, o-phenylenediamine, m-phenylenediamine, p-phenylenediamine, spermidine, spermine, norspermidine, toluene diamine, 1,2-propane-diamine, diethylenetriamine, triethylenetetramine, tetraethylene-pentamine (TEPA), pentaethylenehexamine (PEHA), and combinations thereof. Any suitable alkylene oxide or combination of alkylene oxides can be used to cap the polyamine. In some embodiments, the alkylene oxide is selected from the group consisting of ethylene oxide, propylene oxide, butylene oxide, and combinations thereof. Alkylene oxide-capped polyamines are known in the art, and include, for example, propylene oxide-capped ethylene diamine sold under the trade name CARPOL® EDAP-770 (Carpenter Co., Richmond, Va.) and ethylene and propylene oxide-capped ethylene diamine sold under the trade name CARPOL® EDAP-800 (Carpenter Co., Richmond, Va.).

The polyamines or alkoxylated polyamines (when used) can be present in varying amounts relative the one or more polyols used to form the polyurethane composite. In some embodiments, the polyamines or alkoxylated polyamines can be present in an amount of 30% or less, 25% or less, 20% or less, 15% or less, 10% or less, or 5% or less by weight based on the weight of the one or more polyols.

In certain cases, the polyurethane composite can include at least two polyols. For example, the polyurethane composite can be produced from one or more less reactive polyols and one or more highly reactive polyols. In some embodiments, the at least two polyols can include 50% or more of the first (less reactive) polyol and 30% or less of the second (highly reactive) polyol. In some embodiments, the at least two polyols can include 50% or less of the first (less reactive) polyol and 30% or more of the second (highly reactive) polyol. The one or more polyols for use in the polyurethane composite can have an average functionality of 1.5 to 6.0, 1.5 to 5.0, 1.8 to 4.0, or 1.8 to 3.5. The average hydroxyl number values (as measured in units of mg KOH/g) for the one or more polyols can be from 20 to 600 such as from 20 to 100, 100 to 600, from 150 to 550, from 200 to 500, from 250 to 440, from 300 to 415, from 340 to 400.

As indicated herein, in the polyurethane composite, one or more isocyanates are reacted with the one or more polyols (and any additional isocyanate-reactive monomers) to produce the polyurethane formulation. In general, the ratio of isocyanate groups to the total isocyanate reactive groups, such as hydroxyl groups, water and amine groups, is in the range of about 0.5:1 to about 1.5:1, which when multiplied by 100 produces an isocyanate index between 50 and 150. Additionally, the isocyanate index can be from about 80 to about 120, from about 90 to about 120, from about 100 to about 115, or from about 105 to about 110. Polyisocyanurate composites can also be formed from the one or more isocyanates and the one or more polyols described herein. With regards to the polyisocyanurate formulation, the isocyanate index can be from 180 to 380, for example, from 180 to 350, from 200 to 350, or from 200 to 270. As used herein, an isocyanate may be selected to provide a reduced isocyanate index, which can be reduced without compromising the chemical or mechanical properties of the composite material.

One or more catalysts can be added to facilitate curing and can be used to control the curing time of the polyurethane matrix. Examples of useful catalysts include amine-containing catalysts (including tertiary amines such as DABCO and tetramethylbutanediamine, and diethanolamine) and tin-, mercury-, and bismuth-containing catalysts. In some embodiments, the catalyst includes a delayed-action tin catalyst. In some embodiments, 0.01 wt % to 2 wt % catalyst or catalyst system (e.g., 0.025 wt % to 1 wt %, 0.05 wt % to 0.5 wt %, or 0.1 wt % to about 0.25 wt %) can be used based on the weight of the polyurethane. In some embodiments, 0.05 to 0.5 parts catalyst or catalyst system per hundred parts of polyol can be used.

The polyurethane can be present in the polyurethane composite in amounts from 10% to 60% based on the weight of polyurethane composite. For example, the polyurethane can be included in an amount from 14% to 60% or 20% to 50% by weight, based on the weight of the polyurethane composite. In some embodiments, the polyurethane can be present in an amount of 10% or greater, 15% or greater, 20% or greater, 25% or greater, 30% or greater, 35% or greater, 40% or greater, 45% or greater, 50% or greater, or 55% or greater by weight, based on the weight of the polyurethane composite. In some embodiments, the polyurethane can be present in an amount of 60% or less, 55% or less, 50% or less, 45% or less, 40% or less, 35% or less, 30% or less, 25% or less, 20% or less, or 15% or less by weight, based on the weight of polyurethane composite.

The polyurethane composite can include a particulate filler and particularly an inorganic particulate filler. Suitable examples of particulate fillers can be an ash, ground/recycled glass (e.g., window or bottle glass); milled glass; glass spheres; glass flakes; activated carbon; calcium carbonate; aluminum trihydrate (ATH); silica; sand; ground sand; silica fume; slate dust; crusher fines; red mud; amorphous carbon (e.g., carbon black); clays (e.g., kaolin); mica; talc; wollastonite; alumina; feldspar; bentonite; quartz; garnet; saponite; beidellite; granite; slag; calcium oxide; calcium hydroxide; antimony trioxide; barium sulfate; magnesium oxide; titanium dioxide; zinc carbonate; zinc oxide; nepheline syenite; perlite; diatomite; pyrophillite; flue gas desulfurization (FGD) material; soda ash; trona; expanded clay; expanded shale; expanded perlite; vermiculite; volcanic tuff; pumice; hollow ceramic spheres; hollow plastic spheres; expanded plastic beads (e.g., polystyrene beads); ground tire rubber; and mixtures thereof.

The particulate filler can have a median particle size diameter of from 0.2 micron to 100 microns. For example, the particulate filler can have a median particle size diameter of 100 microns or less, 95 microns or less, 90 microns or less, 85 microns or less, 80 microns or less, 75 microns or less, 70 microns or less, 65 microns or less, 60 microns or less, 55 microns or less, 50 microns or less, 45 microns or less, 40 microns or less, 35 microns or less, 30 microns or less, 25 microns or less, or 20 microns or less. In some embodiments, the particulate filler can have a median particle size diameter of 0.2 microns or more, 0.3 microns or more, 0.4 microns or more, 0.5 microns or more, 0.7 microns or more, 1 micron or more, 2 microns or more, 5 microns or more, 10 microns or more, 15 microns or more, 20 microns or more, 25 microns or more, 30 microns or more, 35 microns or more, 40 microns or more, or 45 microns or more. In some examples, the particulate filler can have a median particle size diameter of from 0.2 microns to 100 microns, 0.2 microns to 90 microns, or 0.3 microns to 80 microns, 1 to 50 microns, 1 to 25 microns, or 5 to 15 microns.

In some embodiments, the particulate filler includes an ash. The ash can be a coal ash or another type of ash such as those produced by firing fuels including industrial gases, petroleum coke, petroleum products, municipal solid waste, paper sludge, wood, sawdust, refuse derived fuels, switchgrass or other biomass material. The coal ash can be fly ash, bottom ash, or combinations thereof. In some examples, the particulate filler includes fly ash. Fly ash is produced from the combustion of pulverized coal in electrical power generating plants. The fly ash useful with the composite materials described herein can be Class C fly ash, Class F fly ash, or a mixture thereof. Fly ash produced by coal-fueled power plants is suitable for incorporation in the composites described herein. In some embodiments, the particulate filler consists of or consists essentially of fly ash.

The fly ash can have a particle size distribution with at least two modes. For example, the particle size distribution of the fly ash can be three, four, five, or more modes. Alternatively, the fly ash can be blended with another fly ash to modify the properties of the fly ash to produce a fly ash having a particle size distribution with at least three modes.

In some embodiments, the fly ash can include a first mode having a median particle diameter of 2.0 microns or less. In some examples, the median particle size of the first mode can be 0.3 microns to 1.5 microns, 0.4 microns to 1 microns, or 0.5 microns to 0.8 microns (e.g., 0.7 microns). The fly ash can include a second mode having a median particle diameter of from 3 microns to less than 40 microns. In some examples, the median particle size of the second mode can be from 5 microns to 35 microns, 10 microns to 30 microns, or 10 microns to 25 microns. The fly ash can include a third mode having a median particle diameter of 40 microns or greater. In some examples, the median particle size of the third mode can be from 40 microns to less than 100 microns, for example from 40 microns to 90 microns, 40 microns to 80 microns, or from 40 microns to 75 microns. In some embodiments, the fly ash can include a first mode having a median particle diameter of from 0.3 microns to 1.0 micron, a second mode having a median particle diameter of from 10 microns to 25 microns, and a third mode having a median particle diameter of from 40 microns to 80 microns. In some examples, the fly ash can also include an additional ultrafine mode with a median particle diameter of from 0.05 microns to 0.2 microns. In some embodiments, the fly ash can have a median particle size diameter of 25 microns or less.

In some embodiments, the particle size distribution can include 11-35% of the particles by volume in the first mode, 65-89% of the particles by volume in the second mode. In some embodiments, the particle size distribution can include 11-17% of the particles by volume in the first mode, 56-74% of the particles by volume in the second mode, and 12-31% of the particles by volume in the third mode. The ratio of the volume of particles in the second mode to the volume of particles in the first mode can be from 4.5 to 7.5.

The particulate filler can be present in the polyurethane composite described herein in amounts from 20% to 90% by weight. Examples of the amount of particulate filler present in the polyurethane composite described herein include 20%, 25%, 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, or 90% by weight. In some embodiments, the particulate filler, for example fly ash, can be present in amounts from 35% to 80% by weight such as from 50% to 80% by weight or from 50% to 75% by weight. In some embodiments, the particulate filler can include calcium carbonate and can be present from 20% to 70% by weight such as from 45% to 65% by weight. In some embodiments, the calcium carbonate can be limestone.

In some embodiments, the particulate filler can include fly ash and calcium carbonate. When used with fly ash, the amount of calcium carbonate in the polyurethane composites can be from 0.1% to 15% by weight, based on the weight of the polyurethane composites. In some embodiments, the polyurethane composites can include 15% or less, 14% or less, 12% or less, 10% or less, or 8% or less by weight calcium carbonate. In some embodiments, the polyurethane composites can include 0.1% or greater, 0.5% or greater, 1% or greater, 2% or greater, 3% or greater, or 5% or greater by weight calcium carbonate. In some embodiments, when used with fly ash, the polyurethane composites can include 1% to 15%, 1% to 10%, or 1% to 8% by weight calcium carbonate.

In some embodiments, the particulate filler can include an organic filler, such as a recycled polymeric material. Suitable examples include pulverized polymeric foam or recycled rubber material.

The composites can include a plurality of inorganic fibers. The inorganic fibers can be any natural or synthetic fiber. Inorganic fibers suitable for use with the composites can include glass fibers, basalt fibers, alumina silica fibers, aluminum oxide fibers, silica fibers, carbon fibers, metal fibers, metal and metal-coated fibers, and mineral fibers (such as stone wool, slag wool, or ceramic fiber wool). In some embodiments, the inorganic fibers can include glass fibers. Glass fibers can include fibrous glass such as E-glass, C-glass, S-glass, and AR-glass fibers. In some examples, fire resistant or retardant glass fibers can be included to impart fire resistance or retarding properties to the polyurethane composites. In some embodiments, the composites can include a combination of fibers that break and fibers that do not break when the polyurethane composites is being formed using processing machinery and/or fractured by external stress.

In some embodiments, the glass fibers can be dispersed within the composite. The glass fibers in the polyurethane composites can be present in the form of individual fibers, chopped fibers, bundles, strings such as yarns, fabrics, papers, rovings, mats, or tows. In some embodiments, the composite can include a plurality of glass fibers having an average length of 1 mm or greater, 1.5 mm or greater, 2 mm or greater, 3 mm or greater, 4 mm or greater, 5 mm or greater, or 6 mm or greater. In some embodiments, the average length of the glass fibers can be 50 mm or less, 40 mm or less, 30 mm or less, 20 mm or less, 15 mm or less, 12 mm or less, or 10 mm or less. In some examples, the glass fibers can be from 1 mm to 50 mm in average length. For example, the glass fibers can be from 1.5 mm to 30 mm, from 2 mm to 30 mm, from 3 mm to 30 mm, or from 3 mm to 15 mm in average length. The glass fibers in the composite can have any dimension of from 1 µm to 30 µm in average diameter. For example, the average diameter of the glass fibers can be 1.5 µm to 30 µm, 3 µm to 20 µm, 4 µm to 18 µm, or 5 µm to 15 µm. The glass fibers can be provided in the composite in a random orientation or can be axially oriented.

The glass fibers can be present in the polyurethane composite in amounts of 15% or less by weight, based on the weight of composite. For example, the glass fibers can be present in amounts from 0.25% to 15%, 0.5% to 15%, 1% to 15%, 0.25% to 10%, 0.5% to 10%, 1% to 10%, 0.25% to 8%, 0.25% to 6%, or 0.25% to 4% by weight, based on the weight of the polyurethane composite.

In addition to the glass fibers, the polyurethane composite includes polyester fibers. The polyesters fiber can be derived from polyalkylene terephthalate fibers such as polyethylene terephthalate fibers (PET) or from other aromatic polyesters.

The polyester fibers in the polyurethane composites can have an average length of 15 mm or less. For example, the polyester fibers can have an average length of 12 mm or less, 10 mm or less, 9 mm or less, 7.5 mm or less, 6 mm or less, 5 mm or less, 3 mm or less, 2 mm or less, 1.5 mm or less, 1 mm or less, 900 µm or less, 800 µm or less, 700 µm or less, 600 µm or less, 500 m or less, 400 µm or less, 300 µm or less, 250 µm or less, 200 µm or less, 150 µm or less, 140 µm or less, 130 µm or less, 120 µm or less, 110 µm or less, 100 µm or less, 90 µm or less, 80 µm or less, 70 µm or less, 60 µm or less, or 50 µm or less. In some embodiments, the polyester fibers can have an average length of 10 µm or greater, 50 µm or greater, 70 m or greater, 80 µm or greater, 90 µm or greater, 100 µm or greater, 110 µm or greater, 120 µm or greater, 200 µm or greater, 300 µm or greater, 500 µm or greater, 750 µm or greater, 1 mm or greater, 2 mm or greater, 3 mm or greater, or 5 mm or greater. In certain embodiments, the polyester fibers in the polyurethane composites can have an average length of from 10 µm to 15 mm, from 10 µm to 10 mm, from 10 µm to 5 mm, from 10 µm to 4 mm, from 30 µm to 3 mm, from 50 µm to 2 mm, or from 100 µm to 1 mm. In some embodiments, the polyester fibers in the composite can include ground polyester fibers. The term "ground" as used herein refers to fibers that have been broken down into smaller pieces by grinding or crushing. A suitable device for preparing ground polyester fibers includes a ball mill. In some cases, the polyester fibers can be ground in a manner similar to grinding of mineral matter. The grinding process can include rolling the ball mill on a polyester fiber yarn which causes fraying and a decrease in the length of the polyester fiber yarn. The grinding can be conducted in dry conditions, where the grinding temperature is kept below the melt or fusion temperature of the fibers. Chopping of polyester fiber yarns is commonly employed to reduce the size of polyester fibers. However, such chopping can be of considerable expense and also may not provide chopped lengths shorter than a certain minimum. In some cases, the polyester fibers do not include fibers that have been prepared by chopping (i.e., chopped fibers).

The polyester fibers in the polyurethane composites can have an average diameter of 100 microns or less. In some embodiments, the polyester fibers can have an average diameter of 95 microns or less, 90 microns or less, 85 microns or less, 80 microns or less, 75 microns or less, 70 microns or less, 65 microns or less, 50 microns or less, 45 microns or less, 40 microns or less, 30 microns or less, or 25 microns or less. In some embodiments, the polyester fibers can have an average diameter of 1 micron or more, 2 microns or more, 3 microns or more, 5 microns or more, 10 microns or more, 15 microns or more, 20 microns or more, 25 microns or more, 30 microns or more, 35 microns or more, 40 microns or more, or 45 microns or more. In some embodiments, the polyester fibers can have an average diameter of from 1 micron to 100 microns, 1 micron to 50 microns, 3 microns to 100 microns, 5 microns to 75 microns, 5 microns to 50 microns, 15 microns to 100 microns, 10 microns to 100 microns, or 10 microns to 75 microns.

The polyester fibers can also be described by their aspect ratio. In some embodiments, the polyester fibers in the polyurethane composites can have an average aspect ratio of length to diameter of 600:1 or less. For example, the polyester fibers can have an average aspect ratio of 500:1 or less, 400:1 or less, 350:1 or less, 300:1 or less, 250:1 or less, 200:1 or less, 150:1 or less, 100:1 or less, 75:1 or less, 50:1 or less, 40:1 or less, 30:1 or less, 25:1 or less, 20:1 or less, 15:1 or less, or 10:1 or less. In some embodiments, the polyester fibers can have an average aspect ratio of length to diameter of 5:1 or greater, 7.5:1 or greater, 10:1 or greater, 15:1 or greater, 20:1 or greater, 25:1 or greater, 50:1 or greater, 75:1 or greater, or 100:1 or greater. In some embodiments, the polyester fibers can have an average aspect ratio of length to diameter of from 5:1 to 500:1, from 5:1 to 400:1, from 5:1 to 300:1, from 5:1 to 200:1, from 5:1 to 100:1, from 5:1 to 75:1, from 5:1 to 50:1, from 10:1 to 100:1, from 10:1 to 75:1, or from 10:1 to 40:1.

The polyester fibers can have an average linear mass density of 9 denier or less, 8 denier or less, 7 denier or less, 6 denier or less, 5 denier or less, or 4 denier or less. In some embodiments, the average linear mass density and can be 0.5 denier or more, 1 denier or more, 1.5 denier or more, 2 denier or more, or 2.5 denier or more. In some examples, the average linear mass density can be from 0.5 denier to 9 denier, from 1 to 8 denier, or from 2 to 6 denier.

The polyester fibers can be present in the polyurethane composites in any suitable amount to confer a desirable property to the composite. In some embodiments, the polyester fibers can be present in the polyurethane composites in amounts of 0.025% or greater. For example, the polyester fibers can be present in the polyurethane composites in amounts of 0.05% or greater, 0.1% or greater, 0.25% or greater, 0.5% or greater, 1% or greater, 1.5% or greater, or 2% or greater, based on the total weight of the composite. In some embodiments, the polyester fibers can be present in the polyurethane composites in amounts of 5% or less, 4% or less, 3.5% or less, 3% or less, 2.5% or less, 2% or less by weight, or 1.5% or less by weight, based on the total weight of the composite. In some embodiments, the polyester fibers can be present in the composites in amounts from 0.025% to 5%, from 0.025% to 4%, from 0.05% to 5%, from 0.05% to 4% by weight, or from 0.05% to 3% by weight, based on the total weight of the composite. In some embodiments, the polyester fibers is present in the polyurethane composites in an effective amount to reduce the LCTE, increase the flexural strength and/or handleability of a composite having a density of 75 lb/ft$^3$ or less, compared to a composite without the polyester fibers.

The polyurethane composite can include additional fiber materials. The additional fiber materials can include polyalkylene fibers, polyamide fibers, phenol-formaldehyde fibers, polyvinyl chloride fibers, polyacrylic fibers, acrylic polyester fibers, polyurethane fibers, polyacrylonitrile fibers, rayon fibers, cellulose fibers, carbon fibers, or combinations thereof. In certain embodiments, the additional fiber materials can include hemp fibers, sisal fibers, cotton fibers, straw, reeds, or other grasses, jute, bagasse fibers, bamboo fibers, abaca fibers, flax, southern pine fibers, wood fibers, cellulose, saw dust, wood shavings, lint, vicose, leather fibers, rayon, and mixtures thereof. Other suitable additional fiber materials include synthetic fibers such as, Kevlar, viscose fibers, Dralon® fibers, polyethylene fibers, polyethylene naphthalate fibers, polypropylene fibers, polyvinyl alcohol fibers, aramid fibers, or combinations thereof.

In some embodiments, the fibers (including the polyester fibers and glass fibers) and/or the particulate filler such as fly ash can be coated with a composition to modify their reactivity. For example, the fibers and/or the particulate filler can be coated with a sizing agent such as a coupling agent (compatibilizer). In some embodiments, the fibers and/or the particulate filler can be coated with a composition for promoting adhesion. U.S. Pat. No. 5,064,876 to Hamada et al. and U.S. Pat. No. 5,082,738 to Swofford, for example, disclose compositions for promoting adhesion. U.S. Pat. No. 4,062,999 to Kondo et al., and U.S. Pat. No. 6,602,379 to Li et al. describe suitable aminosilane compounds for coating fibers. In some embodiments, the fibers and/or the particulate filler are surface coated with a composition comprising a silane compound such as aminosilane. In some embodiments, the fibers and/or the particulate filler are surface coated with a composition comprising an oil, starch, or a combination thereof.

Additional components useful with the polyurethane composites can include foaming agents, blowing agents, surfactants, chain-extenders, crosslinkers, UV stabilizers, fire retardants, antimicrobials, anti-oxidants, and pigments. Though the use of such components is well known to those of skill in the art, some of these additional additives are further described herein.

Chemical foaming agents include azodicarbonamides (e.g., Celogen manufactured by Lion Copolymer Geismar); and other materials that react at the reaction temperature to form gases such as carbon dioxide. In the case of polyurethane foam, water is an exemplary foaming agent that reacts with isocyanate to yield carbon dioxide. The presence of water as an added component or in the filler also can result in the formation of polyurea bonds through the reaction of the water and isocyanate. In some embodiments, water may be present in the mixture used to produce the polyurethane composites in an amount of from greater than 0% to 5% by weight or less, based on the weight of the mixture. In some embodiments, water can be present in a range of 0.02% to 4%, 0.05% to 3%, 0.1% to 2%, or 0.2% to 1% by weight, based on the weight of the mixture. In some embodiments, the mixture used to produce the composite includes less than 0.5% by weight water. In some embodiments, no chemical foaming agents are used. In some embodiments, water is the only foaming agent used.

Surfactants can be used as wetting agents and to assist in mixing and dispersing the materials in a composite. Surfactants can also stabilize and control the size of bubbles formed during the foaming event and the resultant cell structure. Surfactants can be used, for example, in amounts below about 0.5 wt % based on the total weight of the mixture. Examples of surfactants useful with the polyurethanes described herein include anionic, non-ionic and cationic surfactants. For example, silicone surfactants such as Tegostab B-8870, DC-197 and DC-193 (Air Products; Allentown, Pa.) can be used.

Low molecular weight reactants such as chain-extenders and/or crosslinkers can be included in the polyurethane composites described herein. These reactants help the polyurethane composites to distribute and contain the fiber material and/or particulate filler within the composite. Chain-extenders are difunctional molecules, such as diols or diamines, that can polymerize to lengthen the urethane polymer chains. Examples of chain-extenders include ethylene glycol; 1,4-butanediol; ethylene diamine, 4,4'-methylenebis(2-chloroaniline) (MBOCA); diethyltoluene diamine (DETDA); and aromatic diamines such as Unilink 4200 (commercially available from UOP). Crosslinkers are tri- or greater functional molecules that can integrate into a polymer chain through two functionalities and provide one or more further functionalities (i.e., linkage sites) to crosslink to additional polymer chains. Examples of crosslinkers include glycerin, trimethylolpropane, sorbitol, diethanolamine, and triethanolamine. In some polyurethane composites, a crosslinker or chain-extender may be used to replace at least a portion of the one or more polyols in the polyurethane composites. For example, the polyurethane can be formed by the reaction of an isocyanate, a polyol, and a crosslinker.

Coupling agents and other surface treatments such as viscosity reducers, flow control agents, or dispersing agents can be added directly to the filler or fiber, or incorporated prior to, during, and/or after the mixing and reaction of the polyurethane composites. Coupling agents may also reduce the viscosity of the polyurethane composites mixture. Coupling agents can also allow higher filler loadings of the particulate filler such as fly ash, and/or fiber material, and may be used in small quantities. For example, the polyurethane composites may comprise about 0.01 wt % to about 0.5 wt % of a coupling agent. Examples of coupling agents useful with the polyurethane composites described herein include Ken-React LICA 38 and KEN-React KR 55 (Kenrich Petrochemicals; Bayonne, N.J.). Examples of dispersing agents useful with the polyurethane composites described herein include JEFFSPERSE X3202, JEFFSPERSE X3202RF, and JEFFSPERSE X3204 (Huntsman Polyurethanes; Geismar, La.).

Ultraviolet light stabilizers, such as UV absorbers, can be added to the polyurethane composites described herein. Examples of UV light stabilizers include hindered amine type stabilizers and opaque pigments like carbon black powder. Fire retardants can be included to increase the flame or fire resistance of the polyurethane composites. Antimicrobials can be used to limit the growth of mildew and other organisms on the surface of the composite. Antioxidants, such as phenolic antioxidants, can also be added. Antioxidants provide increased UV protection, as well as thermal oxidation protection.

Pigments or dyes can optionally be added to the polyurethane composites described herein. An example of a pigment is iron oxide, which can be added in amounts ranging from about 2 wt % to about 7 wt %, based on the total weight of the polyurethane composites.

The density of the polyurethane composites described herein can be 5 lb/ft$^3$ or greater. For example, the density of the polyurethane composite can be from 10 lb/ft$^3$ to 75 lb/ft$^3$, from 40 lb/ft$^3$ to 75 lb/ft$^3$, from 45 lb/ft$^3$ to 70 lb/ft$^3$, from 5 lb/ft$^3$ to 60 lb/ft$^3$, from 10 lb/ft$^3$ to 60 lb/ft$^3$, from 35 lb/ft$^3$ to 50 lb/ft$^3$, from 35 lb/ft$^3$ to 60 lb/ft$^3$, from 5 lb/ft$^3$ to 30 lb/ft$^3$, from 10 lb/ft$^3$ to 35 lb/ft$^3$, from 15 lb/ft$^3$ to 35 lb/ft$^3$ or from 20 lb/ft$^3$ to 40 lb/ft$^3$. In some embodiments, the density of the polyurethane composite is at least 10 lb/ft$^3$.

Incorporation of the polyester fibers and glass fibers in the composites described herein can reduce their LCTE, compared to similar polyurethane composites without the fibers. The LCTE of the composites may be tailored by adjusting the amount of fibers in the composite material. Without wishing to be bound by theory, the polyester fibers and glass fibers have a lower LCTE than most of the other composite materials. Thus, the use of these fibers can help reduce the LCTE of the composites. Further, a larger effect of the fibers on the LCTE may be due to the anisotropy of the fibers. In particular, the polyester fibers and glass fibers are anisotropic and thus, when included in the composites, have a restrictive effect (i.e. cause less movement) in response to temperature changes. In addition, the polyester fibers and glass fibers have a significantly higher compressive strength in comparison to, for example, the foamed cells in the polyurethane composites. Therefore, the addition of the polyester fibers and glass fibers will not only provide the ability to tailor the LCTE of the composite but will result in the replacement of low compressive strength cell structures with higher compressive strength cell structures. Finally, it is believed that treating the fibers with a bonding agent such as silane can further reduce the LCTE, due to enhanced bonding between the fibers and the composite material.

It is desirable to provide polyurethane composites that are relatively lightweight, strong, and have low LCTE for use in various applications, such as in exterior building products. In some embodiments, including the polyester and glass fibers in the composites can reduce the LCTE by at least 5%, for example, 8% or greater, 12% or greater, or 15% or greater, compared to polyurethane composites without polyester fibers and glass fibers. The LCTE of the composites described herein can be $2.2 \times 10^{-5}$/° C. or less, $2.1 \times 10^{-5}$/° C. or less, $2.0 \times 10^{-5}$/° C. or less, $1.9 \times 10^{-5}$/° C. or less, $1.8 \times 10^{-5}$/° C. or less, $1.7 \times 10^{-5}$/° C. or less, or $1.6 \times 10^{-5}$/° C. or less. In some embodiments, the LCTE of the composites can be from $1.6 \times 10^{-5}$/° C. to $2.2 \times 10^{-5}$/° C. or from $1.7 \times 10^{-5}$/° C. to $2.2 \times 10^{-5}$/° C. or less. The LCTE can be determined using a Thermomechanical Analyzer (TMA). For example, the initial dimension of the polyurethane composite of interest can be measured at ambient temperature. The temperature of the composite is then reduced to −40° C., where the composite equilibrates for five minutes. Next, the temperature of the composite is increased at a rate of 5° C. per minute to 70° C. The resultant one-dimensional size change as the sample is heated can be measured as a percent change from the initial dimension measured. A curve can be generated showing the dimensional change (as mm/mm) over temperature. The LCTE can be calculated from the slope of the curve.

Incorporation of the polyester fibers and glass fibers can increase the flexural strength of the polyurethane composite, compared to polyurethane composites without the polyester and glass fibers. In some embodiments, the flexural strength of the polyurethane composites described herein can be increased by at least 10%, for example, 15% or greater, 20% or greater, 25% or greater, 30% or greater, 35% or greater, 50% or greater, 75% or greater, or even 100% or greater, compared to a polyurethane composites without polyester fibers and glass fibers. The flexural strength of the composites described herein can be 900 psi or greater. For example, the flexural strength of the composites can be 950 psi or greater, 1,000 psi or greater, 1,100 psi or greater, or 1,200 psi or greater. In some embodiments, the flexural strength of the polyurethane composites can be from 900 to 2,000 psi or from 900 to 1,500 psi. The flexural strength can be determined by the load required to fracture a rectangular prism loaded in the three point bend test as described in ASTM C1185-08 (2012).

The polyurethane composites can exhibit a ratio of flexural strength (in psi) to density (in lb/ft$^3$) of from 10:1 to 200:1. In some embodiments, the polyurethane composites can exhibit a ratio of flexural strength (in psi) to density (in lb/ft$^3$) of from 10:1 to 100:1 or from 20:1 to 100:1.

In some embodiments, the modulus of elasticity of the polyurethane composites described herein can be increased by at least 10%, for example, 15% or greater, 20% or greater, 25% or greater, or 30% or greater, compared to a polyurethane composites without polyester fibers and glass fibers. The modulus of elasticity (stiffness) of the polyurethane composites described herein can be 100 ksi or greater, 110 ksi or greater, 120 ksi or greater, 125 ksi or greater, 130 ksi or greater, 135 ksi or greater, 140 ksi or greater, or 145 ksi or greater. For example, the modulus of elasticity can be from 110 to 200 ksi or from 110 to 150 ksi. The modulus of elasticity can be determined as described in ASTM C947-03.

The polyurethane composites can exhibit a ratio of modulus of elasticity (in ksi) to density (in lb/ft$^3$) of from 1:1 to 10:1. In some embodiments, the polyurethane composites can exhibit a ratio of modulus of elasticity (in ksi) to density (in lb/ft$^3$) of 1.5:1 to 10:1 or from 1.5:1 to 5:1.

In some embodiments, the handleability of the polyurethane composites described herein can be increased by at least 30%, for example, 50% or greater, 75% or greater, 85% or greater, or 95% or greater, or even 100% or greater compared to a polyurethane composites without polyester and glass fibers. The handleability of the polyurethane composites can be 3 in lb/in or greater (e.g., from 3 in lb/in to 8 in lb/in or from 3.5 in lb/in to 6 in lb/in). The handleability can be determined by measuring the ability of the composite to be flexed during use and is calculated as 0.5×breaking load×ultimate deflection/thickness of the test specimen. The handleability of the composites can be determined using ASTM C1185-08.

A reinforcement can be included on one or more surfaces of the polyurethane composites described herein. Fiber reinforcements are described in PCT/US2016/027863, the disclosure of which is herein incorporated by reference in its entirety. In some embodiments, the polyurethane composite can include a first fiber reinforcement on a first surface of the composite. In some embodiments, the composite can include a first fiber reinforcement on a first surface of the polyurethane composite and a second fiber reinforcement on a second surface, opposite the first surface, of the polyurethane composite. The fiber reinforcement can include any of the fiber materials as described herein and can include a blend of different fibers (either type or size). In some embodiments, the fiber reinforcement can include glass fibers. The fiber reinforcement can be woven or non-woven. In some embodiments, the polyurethane composite can include a first fiber reinforcement on a first surface of the composite and a material, other than a fiber reinforcement, on a second surface of the composite. In some embodiments, the material can include a cementitious layer, a paper sheet, a metal sheet, a polymeric layer, or a combination thereof. Examples of such materials include an aluminum sheet, an aluminum-plated sheet, a zinc sheet, a zinc-plated sheet, an aluminum/zinc alloy sheet, an aluminum/zinc alloy-plated sheet, a stainless steel sheet, craft paper, a polymeric surfacing film, or a combination thereof. Further advantages of using a fiber reinforcement with the polyurethane composites described herein can also be realized. For example, in some cases, the fiber reinforcement can decrease the LCTE of the composites.

Methods of preparing the polyurethane composites described herein are also disclosed. The composites can be produced using a batch, semi-batch, or continuous process. In some embodiments, the method can include forming a polyurethane mixture. The polyurethane mixture can be produced by mixing the one or more isocyanates, the one or more polyols, and the particulate filler in a mixing apparatus. The materials can be added in any suitable order. For example, in some embodiments, the mixing stage of the method used to prepare the polyurethane composite can include: (1) mixing the polyol and particulate filler; (2) mixing the isocyanate with the polyol, and particulate filler; and optionally (3) mixing the catalyst with the isocyanate, the polyol, and the particulate filler. The fibers (including the glass fibers and polyester fibers) can be added at the same time as the particulate filler, or can be added prior to, during, or after stage (2) or (3).

It is desirable that the polyurethane mixture has a viscosity below a particular threshold at the desired loadings so it can be effectively processed. In some embodiments, the amount of fiber material can be present in the composite mixture in amounts to produce a workable viscosity (initial viscosity) of from 25 Pa·s to 400 Pa·s. For example, the fibers in the polyurethane mixture can be in amounts to produce a workable viscosity from 30 Pa·s to 400 Pa·s, 65 Pa·s to 400 Pa·s, or 80 Pa·s to 400 Pa·s. The viscosity of the composite mixture can be measured using a Brookfield Viscometer.

The polyurethane composite mixture can be blended in any suitable manner to obtain a homogeneous or heterogeneous blend of the one or more isocyanate, the one or more polyols, the particulate filler, and the optional fiber material and catalyst. In some embodiments, mixing can be conducted in a high speed mixer or an extruder an extruder. An ultrasonic device can be used for enhanced mixing and/or wetting of the various components of the composite. The ultrasonic device produces an ultrasound of a certain frequency that can be varied during the mixing and/or extrusion process. The ultrasonic device useful in the preparation of composite panels described herein can be attached to or adjacent to the extruder and/or mixer. For example, the ultrasonic device can be attached to a die or nozzle or to the port of the extruder or mixer. An ultrasonic device may provide de-aeration of undesired gas bubbles and better mixing for the other components, such as blowing agents, surfactants, and catalysts.

The method of making the polyurethane composites can include allowing the one or more isocyanates and the one or more polyols to react in the presence of the particulate filler to form a polyurethane composite. The composite has a first surface and a second surface opposite the first surface. The curing stage of the method used to prepare the polyurethane composite can be carried out in a mold cavity of a mold, the mold cavity formed by at least an interior mold surface. The mold can be a continuous forming system such as a belt molding system or can include individual batch molds. The belt molding system can include a mold cavity formed at least in part by opposing surfaces of two opposed belts. In some embodiments, a molded article can then be formed prior to the additional method steps in forming the composites.

In some embodiments, the polyurethane mixture can be foamed. The polyols and the isocyanate can be allowed to produce a foamed composite material after mixing the components according to the methods described herein. In some embodiments, polyurethane foams can be formed by allowing the mixture to expand via a gas phase to form the foam. The gas phase can be generated in situ from reaction of water with the one or more isocyanates. The gas can be introduced into the polyurethane mixture. Suitable gases are known in the art. In some embodiments, the gas can be captured after gelation (i.e., formation) of the foam. The polyurethane composite can be formed while they are actively foaming or after they have foamed. For example, the polyurethane composite can be placed under the pressure of a mold cavity prior to or during the foaming of the polyurethane composite. In some cases, the mixture can be allowed to rise freely during foaming in the mold.

As discussed herein, incorporation of the fibers (including the polyester fibers and glass fibers) into the polyurethane composites can improve their thermal properties and mechanical performance such as flexural strength, hardness, stiffness, flame resistance, and handleability of such materials, compared to when the fibers are excluded from the polyurethane composite. The optimization of the thermal properties of the composites, such as the LCTE and the mechanical properties allows their use in exterior building materials and other structural applications that is subject to typical fluctuations in the temperature of the outdoor environment that surrounds it. For example, the polyurethane composites can be formed into shaped articles and used in building materials. Suitable building materials include siding materials, building panels, sheets, architectural moldings, sound barriers, thermal barriers, insulation, wall boards, ceiling tiles, ceiling boards, soffits, roofing materials, and other shaped articles. Examples of shaped articles made using the composite panels described herein include roof tiles such as roof tile shingles, roof cover boards, slate panels, shake panels, cast molded products, moldings, sills, stone, masonry, brick products, posts, signs, guard rails, retaining walls, park benches, tables, slats, corner arches, columns, ceiling tiles, or railroad ties.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary and are not intended to limit the scope of the disclosure. Unless indicated otherwise, parts and percentages are on a weight basis, temperature is in ° C. or is at ambient temperature, and pressure is at or near atmospheric.

Thermal and Mechanical Properties of Filled Polyurethane Composites with Various Combinations of Polyester and Glass Fibers.

Preparation of Polyurethane Composite:

Polyurethane composites were prepared using various amounts of ground polyester fibers. The ground polyester fibers are termed PG300, which refers to a ground 3-denier polyester fiber obtained from Flock Tex Inc., Woonsocket, R.I. 02895, USA.

The composites were prepared by mixing a polyol blend containing 6% by weight CARPOL® MX-470 and 94% by weight TEROL® 198 to produce a polyol mixture. The polyol mixture was then mixed with 1% by weight of an amine catalyst (diethanolamine) and 2% by weight of a silicone surfactant in a mixer. Fly ash, glass fibers, and ground polyester fiber (in the amounts described below) were added and wetted with the polyol mixture. Methylene diphenyl diisocyanate (MDI; 104 index; 51.5 g) was then added to the mixer with simultaneous stirring. The mixture was introduced into a confined mold and allowed to cure into a molded shape.

The physical properties of the composites, including linear coefficient of thermal expansion, flexural strength, density, handleability, and modulus were determined on samples extracted from the molded product. The handleability is a measure of the ability of the material to be flexed during use and is calculated as 0.5×breaking load×ultimate deflection/thickness of the test specimen. The modulus is calculated as the stress/strain from the three point bend test. The flexural strength is the load required to fracture a rectangular prism loaded in the three point bend test as described in ASTM C1185-08.

Determination of the Linear Coefficient of Thermal Expansion:

The LCTE was determined using a Thermomechanical Analyzer (TMA). The initial dimension of the polyurethane sample was measured at ambient temperature. The temperature of the sample was then dropped to −40° C. and allowed to equilibrate for five minutes. The length of the sample was measured again. The temperature of the sample was next ramped up at a rate of 5° C. per minute to 70° C. and the length of the sample measured at each interval. The resultant one-dimensional size change as the sample was heated from −40° C. to +70° C. was determined as a percent change from initial measurement at ambient temperature. From the data, a curve was generated showing the dimensional change (as mm/mm) over temperature. The LCTE was calculated from the slope of the curve.

TABLE 1

Flexural strength and modulus of highly filled polyurethane composites comprising various amounts of fiberglass and polyester fibers. All mixtures contained 23% by weight polyurethane.

| Fiberglass content, wt % | Ground polyester content, wt % | Density, pcf | Flexural Strength, psi | Modulus, ksi | Handleability, in*lb/in |
|---|---|---|---|---|---|
| 0 | 0 | 34.4 | 635 | 109 | 2.07 |
| 1 | 0 | 34.4 | 934 | 134 | 3.80 |
| 1 | 0.25 | 34.7 | 998 | 146 | 3.99 |
| 1 | 0.5 | 34.0 | 1023 | 144 | 4.18 |

TABLE 2

Percent increase in mechanical properties of highly-filled polyurethane composites described in Table 1 at 34 pcf density.

| Fiberglass content, wt % | Ground polyester content, wt % | Compared to mixture with no fiberglass and no ground polyester | | |
|---|---|---|---|---|
| | | Flexural Strength | Modulus | Handleability |
| 1 | 0 | 47% | 23% | 84% |
| 1 | 0.25 | 57% | 34% | 93% |
| 1 | 0.5 | 61% | 32% | 102% |

SUMMARY

The presence and amount of fiberglass and polyester fibers in the composites was shown to correlate with the linear coefficient of thermal expansion (LCTE), flexural strength, modulus, and handleability. It is believed that the fibers can provide reinforcement in the polymeric cellular structure, offering resistance to breakage caused by stresses applied to the system and restricting relaxation of molecular chains in response to thermal conditions. It is also found that the polyester fibers can be used to restrict the movement of highly-filled polyurethane composite materials. Although inorganic fibers such as fiberglass can be used to reduce the movement of composite materials subject to temperature changes, their use often increases the viscosity of such materials so much that it becomes not viable to manufacture such materials. The polyester fibers in relatively small amounts can reduce the LCTE of filled polyurethane systems without affecting the viscosity and processability of such systems. This may be due to the flexible nature of the polyester fibers.

The effect of the glass and polyester fibers on the thermal properties of the composites is shown in the FIGURE. The linear coefficient of thermal expansion (LCTE) is calculated as the change in size per degree change in temperature in one dimension of a material being heated from −40° C. to 70° C. As shown in the FIGURE, a 1% by weight replacement of fly ash with chopped fiberglass resulted in a 6% decrease in LCTE, compared to a composite with no fiberglass addition. A subsequent 0.25% by weight replacement of fly ash with ground polyester fiber further reduced the LCTE by 2%. Another 0.25% by weight (an overall 0.5% by weight) replacement of fly ash with ground polyester fiber further reduced the LCTE by 7%. Overall, a composite comprising 1% by weight glass fiber and 0.5% by weight polyester fiber replacement of fly ash exhibited a 15% decrease in LCTE, compared to the control composite with no fiber addition.

In addition to improving the LCTE, the presence and amount of fibers also improved the structural properties (including flexural strength, modulus, and handleability) of the polyurethane systems. The effect of the glass and polyester fibers on the mechanical properties of the composites is shown in Tables 1 and 2. At the same density, a 1% by weight replacement of fly ash with chopped fiberglass showed a 47% improvement in flexural strength 47%, a 23% improvement in modulus, and an 84% improvement in handleability, compared to the control with no glass fibers or polyester fibers. A subsequent 0.25% by weight replacement of fly ash with ground 3-denier polyester fibers resulted in a 57% improvement in flexural strength, a 34% improvement in modulus, and a 93% improvement in handleability, compared to the control. Another 0.25% by weight replacement of fly ash with ground polyester fibers resulted in a 61% improvement in flexural strength and a 102% improvement in handeability, but negligible effect on modulus, compared to the control.

The compositions and methods of the appended claims are not limited in scope by the specific compositions and methods described herein, which are intended as illustrations of a few aspects of the claims and any compositions and methods that are functionally equivalent are intended to fall within the scope of the claims. Various modifications of the compositions and methods in addition to those shown and described herein are intended to fall within the scope of the appended claims. Further, while only certain representative materials and method steps disclosed herein are specifically described, other combinations of the materials and method steps also are intended to fall within the scope of the appended claims, even if not specifically recited. Thus, a combination of steps, elements, components, or constituents may be explicitly mentioned herein; however, other combinations of steps, elements, components, and constituents are included, even though not explicitly stated. The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments and are also disclosed. As used in this disclosure and in the appended claims, the singular forms "a", "an", "the", include plural referents unless the context clearly dictates otherwise.

What is claimed is:

1. A filled polyurethane composite, comprising:
   (a) a polyurethane formed by the reaction of (i) one or more isocyanates selected from the group consisting of diisocyanates, polyisocyanates, and mixtures thereof, and (ii) one or more polyols;
   (b) from greater than 50% to 90% by weight, based on the total weight of the composite, of a filler;
   (c) from 0.25% to 10% by weight, based on the total weight of the composite, of glass fibers; and
   (d) from 0.025% to 5% by weight, based on the total weight of the composite, of polyester fibers, wherein the polyester fibers have an average aspect ratio of length to diameter of from 5:1 to 600:1,
   wherein the polyurethane composite has a linear coefficient of thermal expansion of $2.2 \times 10^{-5}/°$ C. or less, at a temperature ranging from $-40°$ C. to $70°$ C.

2. The composite of claim 1, wherein the polyester fibers have an average aspect ratio of length to diameter of from 10:1 to 50:1.

3. The composite of claim 1, wherein the polyester fibers are ground polyester fibers.

4. The composite of claim 1, wherein the filler comprises fly ash.

5. The composite of claim 1, wherein the composite has a linear coefficient of thermal expansion of from $1.6 \times 10^{-5}/°$ C. to $2.2 \times 10^{-5}/°$ C., at a temperature ranging from $-40°$ C. to $70°$ C.

6. A building product, comprising:
   (a) a polyurethane formed by the reaction of (i) one or more isocyanates selected from the group consisting of diisocyanates, polyisocyanates, and mixtures thereof, and (ii) one or more polyols;
   (b) from greater than 50% to 90% by weight, based on the total weight of the building product, of fly ash;
   (c) 0.25% to 10% by weight, based on the total weight of the building product, of glass fibers, wherein the glass fibers have an average length of from 1.5 to 33 mm and an average diameter of from 5 to 55 microns; and
   (d) 0.025% to 5% by weight, based on the total weight of the building product, of polyester fibers, wherein the polyester fibers have an average aspect ratio of length to diameter of from 5:1 to 50:1;
   wherein the building product has a linear coefficient of thermal expansion of $2.2 \times 10^{-5}/°$ C. or less and a density of from 10 lb/ft$^3$ to 75 lb/ft$^3$, at a temperature ranging from $-40°$ C. to $70°$ C.

7. A method of making a polyurethane composite, comprising:
   (a) mixing one or more isocyanates selected from the group consisting of diisocyanates, polyisocyanates, and mixtures thereof, one or more polyols, a filler, glass fibers, and polyester fibers to produce a mixture,
   wherein the filler is present in an amount from greater than 50% to 90% by weight, based on the total weight of the mixture,
   wherein the polyester fibers are present in an amount from greater than 0.025% to 5% by weight, based on the total weight of the mixture, and the polyester fibers have an average aspect ratio of length to diameter of from 5:1 to 600:1, and
   wherein the glass fibers are present in an amount from greater than 0.25% to 10% by weight, based on the total weight of the mixture,
   (b) applying the mixture to a mold; and
   (c) allowing the mixture to react and expand to form the polyurethane composite.

8. The method of claim 7, wherein the polyester fibers are present in an amount of from 0.05% to 3% by weight, based on the total weight of the composite.

9. The method of claim 7, wherein the polyester fibers have an average length of 15 mm or less.

10. The method of claim 7, wherein the average diameter of the polyester fibers is 100 microns or less.

11. The method of claim 7, wherein the polyester fibers have an average aspect ratio of length to diameter of from 10:1 to 50:1.

12. The method of claim 7, wherein the polyesters have an average linear mass density of 9 denier or less.

13. The method of claim 7, wherein the polyester fibers are ground polyester fibers.

14. The method of claim 7, wherein the polyester fibers are coated with an agent selected from surfactants, bonding agents, pigments, coupling agents, and combinations thereof.

15. The method of claim 7, wherein the glass fibers are present in an amount of from 0.5% to 5% by weight, based on the total weight of the composite.

16. The method of claim 7, wherein the glass fibers have an average length of from 1.5 mm to 33 mm.

17. The method of claim 7, wherein the glass fibers have an average diameter of from 5 microns to 55 microns.

18. The method of claim 7, wherein the filler comprises fly ash.

19. The method of claim 7, wherein the composite has a linear coefficient of expansion of from $1.6 \times 10^{-5}/°C$ to $2.2 \times 10^{-5}/°C$, at a temperature ranging from $-40°C$ to $70°C$.

20. The method of claim 7, wherein the composite has a density of from 10 lb/ft$^3$ to 75 lb/ft$^3$.

* * * * *